May 20, 1969   S. MASTROPOLO   3,444,642
HARPOON
Filed Aug. 28, 1967
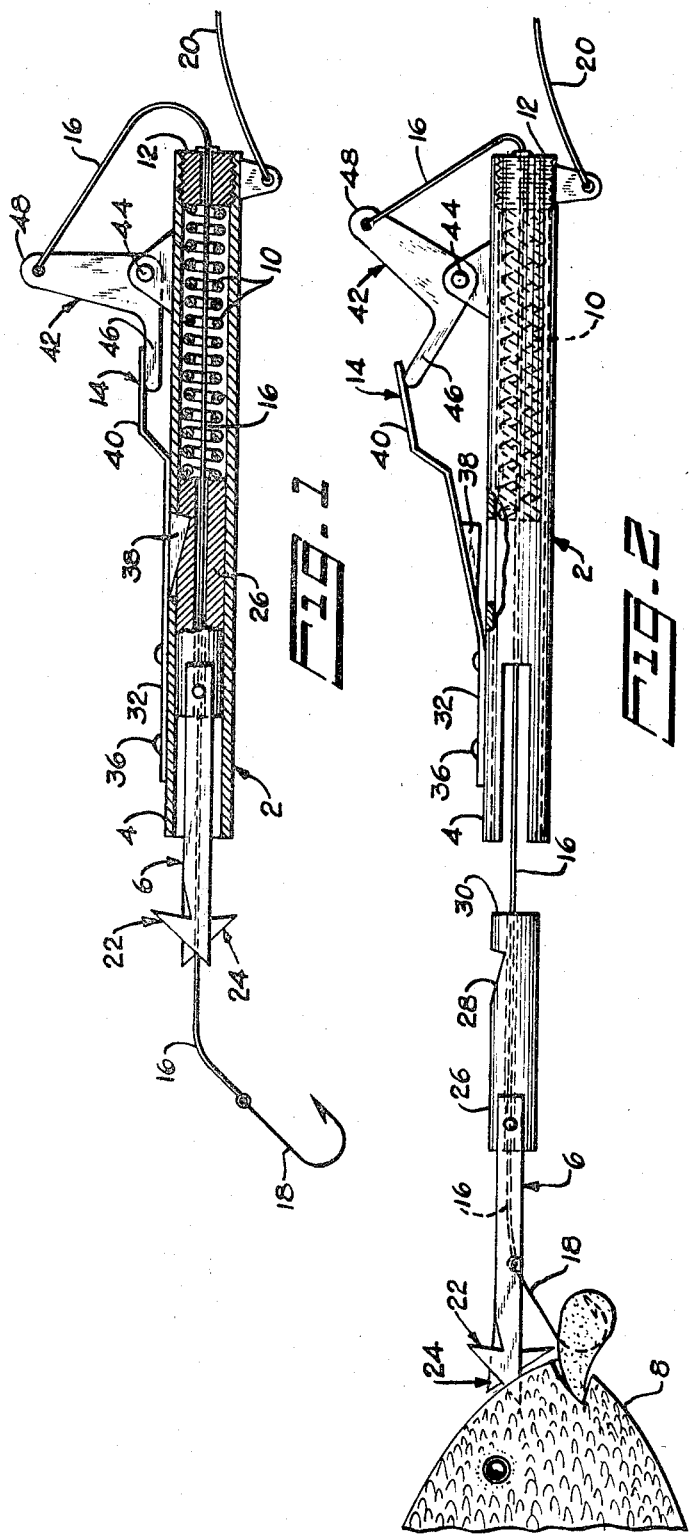
INVENTOR.
SAL MASTROPOLO

United States Patent Office 3,444,642
Patented May 20, 1969

3,444,642
HARPOON
Sal Mastropolo, 1010 NW. 108th Terrace,
Miami, Fla. 33168
Filed Aug. 28, 1967, Ser. No. 663,675
Int. Cl. A01k *81/00, 81/04*
U.S. Cl. 43—6     2 Claims

ABSTRACT OF THE DISCLOSURE

A harpoon device consisting of a harpoon and a body member including a biasing means therein to propel the harpoon, and a trigger mechanism connected thereto for releasing the harpoon. The body member is connected to a fishing line, and the trigger mechanism is connected to a baitline having a bait-attaching device at the distal end thereof for actuating the harpoon device. The harpoon includes a guide member for guiding the harpoon along the baitline to insure that the harpoon travels toward the bait-attaching device when the harpoon is propelled from the body member.

Background of the invention

This invention relates to an improved bait-operated fishing harpoon, and more particularly, to a harpoon that is guided to the fish by means of a bait line between the body member of the harpoon device and the bait-attaching device adjacent the distal end of the bait line.

As is perhaps well known, harpoon guns have been designed in the past to catch fish of all sizes. The accuracy of such guns is limited by a single trajectory, once the harpoon leaves the gun, therefore the harpoon will miss many moving fish. Also, the complexity of design and high production cost of such guns has limited their sales potential, especially for harpoon guns that are utilized with a rod and reel device for catching small fish.

Summary of the invention

The present invention relates to a new and improved bait-operated harpoon device comprising a harpoon, and a body member including a harpoon propelling means therein for propelling the harpoon in the direction of a fish, a triggering device connected to the body member for holding the harpoon in a cocked position and for releasing the harpoon, and a bait line connected to the body member with a bait-attaching device adjacent the distal end thereof. The harpoon has a guide member for slidably connecting the harpoon to the bait line in order to guide the harpoon in a path toward the bait-attaching device.

It is an object of this invention to provide a harpoon device that will add to the certainty of catching a fish that strikes the bait on the end of the bait line.

Anoher object of this invention is to provide a harpoon device that controls the trajectory of the harpoon in flight.

A further object of this invention is to provide a harpoon device that guides the harpoon to the bait-attaching device.

It is an additional object of this invention to provide a non-complex, low cost, harpoon device in order to insure that a fish is securely held at the end of a fishing line once the fish strikes the bait.

In accordance with these and other objects which will be apparent hereinafter, the instant invention will now be described with particular reference to the accompanying drawing illustrating the preferred embodiment of this invention.

Brief description of the drawing

In the drawing:
FIGURE 1 is a side view partially in cross section of the harpoon device in the cocked position;
FIGURE 2 is a side view of the harpoon device showing the harpoon in flight.

Description of the preferred embodiment

Referring now in detail to the drawing, wherein the preferred embodiment of the invention is shown and referring, particularly to FIGURES 1 and 2, the harpoon device, generally designated as numeral 2, includes a hollow body portion 4, and a harpoon 6 that may be propelled or driven against a fish 8. The harpoon device is actuated by a fish striking a piece of bait connected to the harpoon device.

The cylindrical body portion 4 of the harpoon device includes a biasing means 10 which is illustrated as a spring for providing the power to propel the harpoon from the body portion 4. The spring 10 is placed in the body portion and the rear portion of the spring is fixed in relation to the body portion. The spring 10 is connected to the rear end of body portion by means of fastener or bolt 12. The triggering means includes a triggering device 14 that is connected to the body portion 4 for holding the harpoon 6 in a cocked position against the spring 10 and for releasing the harpoon 6 for flight. A bait line 16 having a bait-attaching device or fish hook 18 at the distal end thereof is threaded through harpoon 6, the harpoon device 2 and bolt 12. The other end of the bait line is connected to the triggering means in order to release the harpoon when a fish actuates the bait-attaching device 18.

The harpoon 6 includes a pair of spaced-apart spear-shaped members 22 and 24 connected to a cylindrical member 26. The spear-shaped members 22 and 24 have barbs thereon to hamper removal of the spear members once they penetrate a fish. The harpoon is cocked by placing the cylindrical member 26 in the cylindrical body portion 4 of the harpoon device. The rear end 30 of the harpoon is designed to engage the biasing means 10 for propelling purposes. The cylindrical member 26 has a notch 28 therein for connecting the harpoon 6 to the triggering device 14 in order to hold the harpoon in a cocked position against the biasing means 10. When the triggering device 14 is raised, the harpoon is propelled from the cylindrical body portion 4. The bait line 16, which passes through the cylindrical member 26 guides the harpoon during its flight path between the harpoon device 2 and the bait-holding device 18.

The triggering device 14 includes a resilient member 32 shown as flat spring member which is connected to the hollow body portion 4 by means of a fastener or rivets 36 adjacent to the forward end of the body portion. A wedge-shaped member 38 is carried by the spring member 32 intermediate of the ends. The wedge-shaped member 38 mates with the notch 28 in the member 26 of the harpoon. When the harpoon is moved into the body portion 4 of the harpoon device, the rear end 30 of the harpoon engages the slanting side of the wedge-shaped member 38. Upon contact, the resilient member or flat spring 32 will yield and the flat spring 32 and the wedge-shaped member 38 will move upward allowing the harpoon to be moved into the body portion 4 and against the spring 10. The spring 10 is compressed by the harpoon. When the notch 28 in the harpoon is moved directly beneath the wedge-shaped member 38, the flat spring member 38 will move the wedge-shaped device into the notch 28, thereby locking the harpoon in a cocked position.

To trigger the harpoon, the distal end 40 of spring member 32 is raised above the body portion 4 of the harpoon device. An L-shaped member 42 is used to raise the distal end 40 of the spring member 32. The L-shaped member 42 is pivotally connected by pin 44 to the body portion of the harpoon device. Arm 46 of the L-shaped member projects beneath the distal end 40 of the spring member 32 for triggering the harpoon by raising spring member 32 in order to disengage the wedge-shaped member 38 from the notch 28 in the harpoon. When the wedge-shaped member 38 is raised from the notch 28, the harpoon will be propelled toward the fish by spring 10.

The L-shaped member 42 is rotated clockwise by a fish striking the bait at the distal end of the baitline 16. The baitline 16 is connected to arm 48 of the L-shaped member 42. When the baitline is pulled taut, the L-shaped member will be rotated clockwise to trigger the harpoon 6.

In operation, the fishing line 20 is attached to the harpoon device 2. A baiting device 18 is connected to a baitline 16 which is threaded through the harpoon 6 and the body portion 4 and connected to arm 48 of the L-shaped member. Therefore, the harpoon device is cocked by moving the harpoon 6 into the body portion against spring 10 until the wedge-shaped member 38 is biased into the notch 28 in the harpoon. When a fish engages or strikes the bait-attaching device 18 the fish will pull the baitline taut, which will rotate the L-shaped member 42 to disengage the wedge member 38 from the notch 28 to release the harpoon. The harpoon's trajectory will be governed by the position of the baitline. Any fish hit by the harpoon will be caught on the fishing line.

The instant invention has been shown and described herein in what is considered to be the most practical and preferred embodiment. It is recognized, however, that departures may be made therefrom within the scope of the invention.

What is claimed is:
1. A harpoon device comprising,
a harpoon
a body member including,
a connecting means for connecting said body memmer to a fishing line,
a biasing means connected
to said body member for propelling said harpoon into a fish,
a triggering device connected
to said body member for releasing said harpoon from a cocked position,
a bait attaching member, and
a connecting member connected between the bait attaching member to said triggering device,
said harpoon including,
a guide means slidably connected to said connecting member for guiding said harpoon to the bait attaching member during the flight path of harpoon, and at least one spear head at the forward end of said harpoon.

2. A harpoon device as set forth in claim 1, wherein said harpoon includes
a pair of spaced apart spear heads connected to said harpoon,
said guide means being the
body of the harpoon with the connecting member passing therethrough.

References Cited

UNITED STATES PATENTS

| 611,400 | 9/1898 | Wenger | 43—34 |
| 2,179,597 | 11/1939 | Palsson | 43—6 |
| 2,179,598 | 11/1939 | Palsson | 43—6 |

WARNER H. CAMP, *Primary Examiner.*

U.S. Cl. X.R.

43—34